United States Patent Office

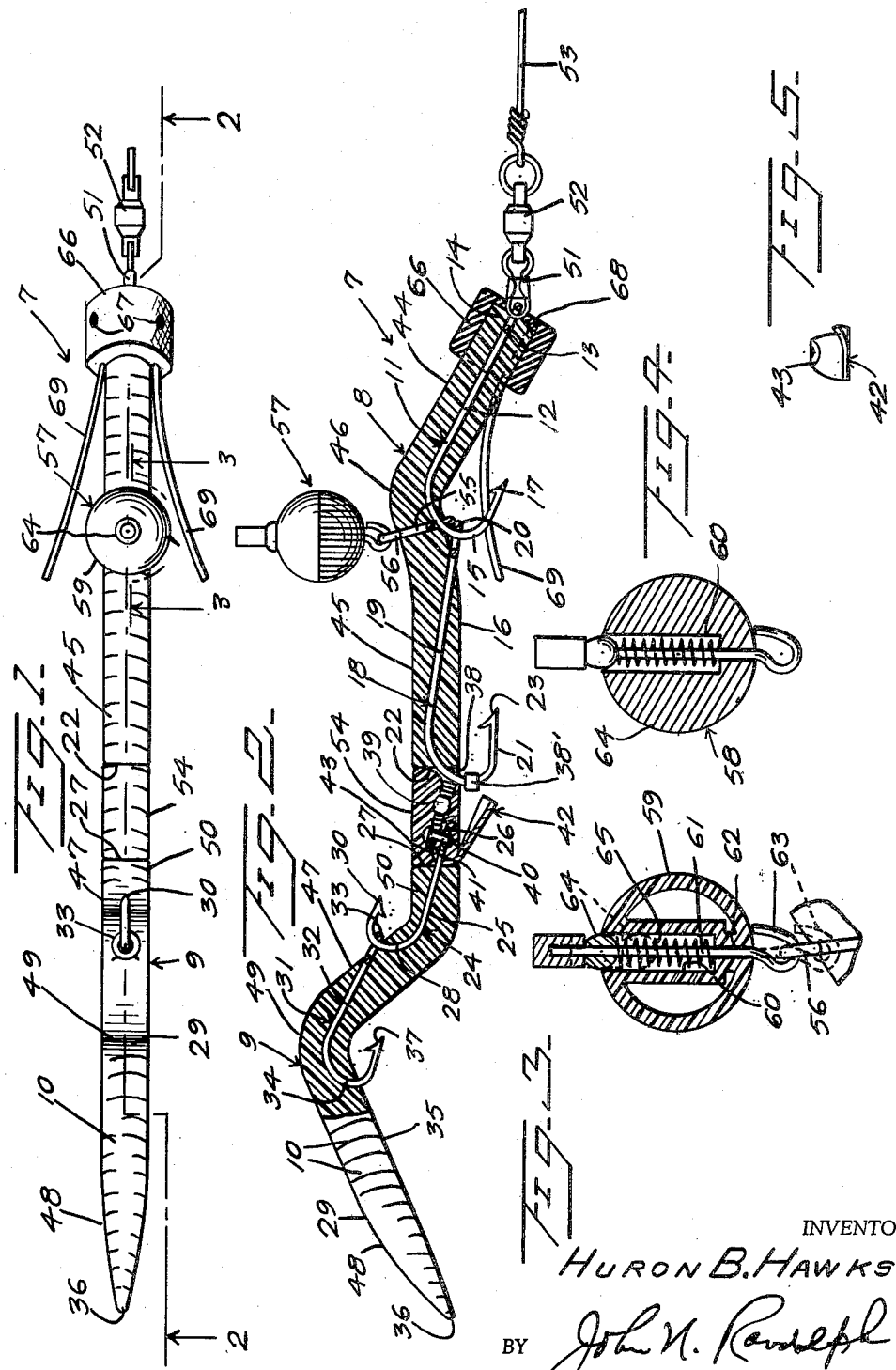

3,017,716
Patented Jan. 23, 1962

3,017,716
FISH LURE
Huron B. Hawks, Hollis, Ark.
(Hollis Rte., Plainview, Ark.)
Filed Aug. 5, 1960, Ser. No. 47,725
9 Claims. (Cl. 43—42.16)

This invention relates to a novel artificial fish lure which is designed to very realistically simulate certain natural bait in both appearance and action.

More particularly, it is an object of the invention to provide an artificial fish lure capable of simulating a worm or land lizard, both of which constitute natural fish bait, and wherein the lure body, which is formed of a flexible and elastic material, is caused to assume a natural appearance of the live bait, simulated thereby, by interconnection of a plurality of fishhooks the shanks of which are embedded in said lure body.

Still a further object of the invention is to provide a fish lure wherein the lure body is composed of sections and the lure is provided with means for causing the tail section thereof to revolve, as the lure is drawn through the water, to produce a wiggling action which very realistically simulates the movement of a worm or lizard in the water.

Various other objects and advantages of the invention will hereinafter become more fully apparent from the following description of the drawing, illustrating a presently preferred embodiment thereof, and wherein:

FIGURE 1 is a plan view of the lure, as it will appear in use;

FIGURE 2 is a longitudinal sectional view, partly in side elevational thereof, taken substantially along the line 2—2 of FIGURE 1;

FIGURE 3 is an enlarged fragmentary vertical sectional view, taken substantially along a plane as indicated by the line 3—3 of FIGURE 1;

FIGURE 4 is a vertical sectional view, partly in elevation of an attachment for the fish lure, and FIGURE 5 is a front elevational view of one element of the fish lure.

Referring more specifically to the drawing, the fish lure in its entirety is designated generally 7 and includes an elongated forward body section 8 and an elongated rear body or tail section 9. The body sections 8 and 9 are each preferably formed of a synthetic resin plastic which is molded so that said body sections will have exterior ridges 10 very realistically simulating the exterior contour of a worm, and the body sections are colored to correspond to the natural coloring of a worm. In addition, the material of which the body sections 8 and 9 are formed is soft, flexible and elastic and has substantially the same feel to touch as a natural worm. The combined lengths of the two body sections 8 and 9 is approximately equal to the length of a large earthworm or bloodworm.

A conventional single barbed fishhook 11 has a shank 12 embedded in and disposed longitudinally of a forward portion of the forward body section 8. The shank 12 has an eye 13 which is normally embedded in the forward end 14 of the body section 8. The bend 15 of the hook 11 extends outwardly from the underside 16 of the body section 8, approximately midway of the ends thereof, and the barbed and pointed end 17 of said hook 11 extends downwardly and forwardly from the bend 15.

A second single barbed fishhook 18 has a shank 19 embedded in and disposed longitudinally of the rear half of the forward body section 8 and is provided at its forward end with an eye 20 which projects from the underside 16 and through which the bend 15 of the hook 11 engages for attaching the hooks 11 and 18 in tandem, as clearly illustrated in FIGURE 2. The bend 21 of the hook 18 extends outwardly and downwardly from the rear end 22 of the forward body section 8 and is curved forwardly so that the pointed and barbed end 23 of said hook 18 extends forwardly from the bend 21 and is disposed beneath and spaced from the underside 16 of the body section 8 and near its rear end 22.

A single barbed fishhook 24 has a shank 25 embedded in and extending substantially longitudinally of the forward portion of the tail section 9 and which terminates at its forward end in an eye 26, which is disposed beyond the forward end 27 of the tail section 9. The hook 24 has an upwardly and forwardly turned bend 28 which projects outwardly from an upper side 29 of the tail section 9 and which has a forwardly and downwardly inclined extension terminating in a barbed point 30 which is disposed above a portion of said upper side 29 and near the forward end 27 of the tail section 9.

A single barbed fishhook 31 has a shank 32 embedded in the intermediate portion of the tail section 9 and which terminates at its forward end in an eye 33 which protrudes from the upper side 29 and engages around a part of the bend 28 of the hook 24. The other rear end of the shank 32 terminates in a downwardly and forwardly curved bend 34 which projects outwardly from the underside 35 of the tail section 9, at a point spaced a substantial distance from the tapered rear or trailing end 36 of said tail section 9. An extension of the bend 34 extends downwardly and forwardly and terminates in a barbed point 37 which is disposed beneath said underside 35.

A forward eye 38 of a small conventional swivel 39 has a loose engagement with the bend 21 of the hook 18, behind and adjacent the rear end 22 of the forward body section 8, and a rivet 40 extends through the hook eye 26 and through a rear eye 41 of the swivel 39 for connecting said swivel to the hook 24. A small washer 38', preferably of rubber, is forced over the barb 23 and frictionally engages the bend 21, beneath the eye 38, to retain the swivel 39 attached to the hook 18.

A blade 42 has an upper rear portion 43 which is turned back and through which the rivet 40 extends for securing the blade 42 to the fishhook 24 and swivel 39. The rivet 40 has a tight fitting clamping engagement with the parts 26, 41 and 43 for securing the swivel 39 and blade 42 rigidly to the fishhook 24. The blade 42 extends downwardly and forwardly at an incline from its rear end 43 and is pitched, as best seen in FIGURE 5. The blade 42 terminates behind the bend 24 of the fishhook 18 and is disposed beneath the plane of the undersides 16 and 35 of the adjacent ends of the body sections 8 and 9.

As seen in FIGURE 2, the over-all length of the connected hooks 11 and 18, between the eye 13 and bend 21, is slightly less than the normal over-all length of the forward body section 8 so that the body section 8 is drawn together or compressed lengthwise by said fishhooks. Consequently, the body section 8 assumes a form wherein its forward portion 44 is substantially straight and inclined downwardly and forwardly toward its forward end 14, while its rear portion 45, which is likewise substantially straight, is disposed substantially horizontal and at an angle to the forward portion 44. The tendency of the hooks 11 and 18 to draw the portions 44 and 45 toward one another, causes a portion 46 of the body section 8, located between the portions 44 and 45, to be bowed upwardly, as seen in FIGURE 2.

The shanks of the hooks 24 and 31 are shorter than the shanks of the hooks 11 and 18, as seen in FIGURE 2. The hooks 24 and 31 also compress a part of the tail portion 9 through which said hooks extend and cause the tail portion to assume a sinuous shape including portions 47 and 48 which are disposed at an incline relative to one another and which merge in an arcuate or bowed portion 49, in which the rear portion of the hook shank 32 is disposed. The part 48 extends from the bowed portion 49 to the trailing end 36 and most of said part 48 is disposed beyond the bend 34 of the rearmost hook 31, so that said portion can flex freely. The hook shank 32 and a part of the hook shank 25 and bend 28 are embedded in the portion 47. The tail portion 9 also includes a short forward end portion 50, extending from the forward end of the portion 47 to the end 27, in which a part of the hook shank 25 is embedded, and which portion 50 is normally disposed substantially in alignment with the portion 45.

Due to the resiliency of the material of which the body portions 8 and 9 are formed, the portion 14 can be displaced rearwardly relative to the fishhook 11 to expose the eye 13 so that a conventional clasp 51 can be attached thereto, said clasp being attached to one end of a conventional swivel 52, and to the opposite end of which an end of a fishing line or leader 53 is attached. The swivel 52 and clasp 51 may be smaller than as illustrated in relation to the lure 7 so that said parts will be relatively inconspecuous. As the fish lure 7 is drawn through the water from left to right, as seen in FIGURES 1 and 2, pressure of the water against the blade 42 will cause the tail section 9 and parts carried thereby to revolve relative to the forward part of the swivel 39 and the forward body section 8 and parts carried thereby. This movement of the tail section 9 will cause the portion 48 thereof, located beyond the fishhook 31, to vibrate or flutter, so that the tail section 9 will very realistically simulate the movement of the rear half of the body of a swimming worm. Additionally, the portions 47, 48 and 49 will describe an arc as the tail portion 9 revolves and which will cause the forward body section 8 to wiggle in a manner to very realistically simulate the movements of the forward part of the body of a swimming worm.

Only a small portion of each of the fishhooks 11, 18, 24 and 31 will be exposed to further enhance the natural appearance of the lure, and said fishhooks, the swivel 39 and blade 42 are preferably of a color corresponding to the color of the body sections 8 and 9 to thereby further camouflage said parts. In addition, a small tubular section 54, of the same material as the body sections 8 and 9, may be disposed between said body sections and around the swivel 39 to give the body a substantially uninterrupted appearance.

The lure 7 may additionally include an attaching member 55 which extends through the body section 8, behind and adjacent its portion 46, and which has a lower end attached to the bend 15 above the hook eye 20, and an upper end terminating in an eye 56 which protrudes from the upper side of the body section 8.

A small float, designated generally 57, may be attached to the eye 56 to cause the lure 7 to run shallow or adjacent the surface when drawn through the water, or a sinker 58, as seen in FIGURE 4, can be attached to the eye 56 in lieu of the float 57, to cause the lure 7 to run deep. The float 57, as best illustrated in FIGURE 3, comprises a lightweight hollow spherical body 59 having a passage 60 extending diametrically therethrough. A wire 61 extends slidably through a restricted lower end 62 of the passage 60 and terminates therebeneath in a hook 63 which detachably engages the eye 56. A head 64 is secured to the other end of the wire 61 and a compression spring 65 is mounted on said wire 61 and is contained under compression within the passage 60, between the head 64 and the restricted passage end 62, for normally holding the bill of the hook 63 against the body 59 to retain said hook attached to the eye 56, until the head 64 is displaced downwardly to move the hook 63 away from the body 59 and to its dotted line position of FIGURE 3. The sinker 58 corresponds with the float 57 except that the body 64 thereof is formed of a heavy material such as lead and is solid except for its diametrical passage 60.

A hollow or tubular body 66, preferably formed of foam rubber, may be detachably applied over the forward body portion 14 to provide a head. The head 66 is held applied by friction to the body portion 14 and is preferably of a color contrasting with the color of the body sections 8 and 9 for causing the lure to simulate a different natural bait such as a land lizard. The head 66 may be marked to simulate eyes 67, as seen in FIGURE 1. A strand of rubber has an intermediate portion 68 embedded in the head 66 and end portions 69 which extend rearwardly from said head to simulate legs. The strand ends 69 will flex readily as the lure is drawn through the water.

Various other modifications and changes are contemplated and may be resorted to, without departing from the function or scope of the invention as hereinafter defined by the appended claims.

I claim as my invention:

1. A fish lure comprising an elongated body formed of a soft elastic and flexible material and including a forward body section and a rear body or tail section, a first pair of fishhooks including a front fishhook and a rear fishhook embedded in said forward body section and loosely connected in tandem to one another and having barbed ends protruding from said forward body section, said front fishhook having an eye located adjacent the forward end of said forward body section and adapted to be attached to a fishing line or leader extension, a second pair of fishhooks embedded in said tail section and loosely connected to one another in tandem and having barbed ends protruding from said tail section, the forward one of the fishhooks of said second pair having an eye at its forward end protruding from the forward end of the tail section, and a swivel connected to said last mentioned eye and to a rearmost bend portion of the rear fishhook of said first pair for swivelly connecting the tail section to the forward body section.

2. A fish lure as in claim 1, and a pitched blade rigidly secured to said eye of the forward hook of the second pair and projecting therefrom away from the body for causing the tail section to revolve with said second pair of hooks relative to the forward section when the lure is drawn through the water with the forward section in advance of the tail section.

3. A fish lure as in claim 1, the portions of each of the body sections in which the tandem hooks thereof are embedded being of a normal length greater than said embedded portions of the tandem hooks for compressing the body sections lengthwise for causing the body to assume a sinuous shape.

4. A fish lure as in claim 1, the hooks of each of said pairs of hooks being disposed relative to one another whereby said body sections are distorted and caused to assume a sinuous shape.

5. A fish lure as in claim 4, said tail section including a portion of substantial length disposed beyond the rear fishhook of said second pair to provide a flexible tail portion.

6. A fish lure as in claim 1, and means partially embedded in the forward body section for detachably fastening a float to one of the fishhooks of said first pair.

7. A fish lure as in claim 1, and means partially embedded in the forward body section for detachably fastening a sinker to one of the fishhooks of said first pair.

8. A fish lure as in claim 1, a head formed of yieldable buoyant material detachably mounted on the forward body section and at the forward end thereof, and flexible strand elements secured to and projecting rearwardly from said head, 9. A fish lure comprising an elongated body composed of a soft, flexible and elastic material and including a forward body section and a rear body section, means bracing and shaping each of the body sections comprising fishhooks connected together in tandem, a swivel connecting said fishhooks of the two body sections for swivelly connecting the rear body section in tandem behind the forward body section, and a pitched blade projecting from the fishhook of the rear body section for causing said rear body section to revolve behind the forward body section as the lure is drawn through the water.

References Cited in the file of this patent
UNITED STATES PATENTS

| | | |
|---|---|---|
| Re. 17,955 | Arbogast | Feb. 10, 1931 |
| 975,833 | Cox | Nov. 15, 1910 |
| 2,501,103 | Slater | Mar. 21, 1950 |
| 2,690,026 | King | Sept. 28, 1954 |
| 2,792,662 | Norton | May 21, 1957 |